United States Patent [19]

Hawker

[11] Patent Number: 5,115,586
[45] Date of Patent: May 26, 1992

[54] CABLE MARKERS

[75] Inventor: Michael J. Hawker, Hadleigh, England

[73] Assignee: Development Technology Limited, Hadleigh, United Kingdom

[21] Appl. No.: 513,847

[22] Filed: Apr. 24, 1990

[51] Int. Cl.$^5$ .............................................. G09F 03/00
[52] U.S. Cl. ............................................................ 40/316
[58] Field of Search ................... 40/316, 322, 299; 24/20 TT, 487, 543; 248/68.1

[56] References Cited

U.S. PATENT DOCUMENTS

| | | | |
|---|---|---|---|
| 870,763 | 11/1907 | Chaffee | 24/20 TT |
| 1,649,752 | 11/1927 | Stone | 24/20 TT |
| 3,913,187 | 10/1975 | Okuda | 24/543 X |
| 3,977,104 | 8/1976 | Stupar | 40/299 |
| 4,539,767 | 9/1985 | Jaffe | 40/316 |
| 4,637,097 | 1/1987 | Secord | 24/487 X |
| 4,641,443 | 2/1987 | Wilmes | 40/316 |

FOREIGN PATENT DOCUMENTS

| | | |
|---|---|---|
| 0145852 | 6/1985 | European Pat. Off. . |
| 1110710 | 7/1961 | Fed. Rep. of Germany . |
| 750670 | 6/1956 | United Kingdom . |
| 1455535 | 11/1976 | United Kingdom . |
| 1547215 | 6/1979 | United Kingdom . |
| 2130147 | 5/1984 | United Kingdom . |
| 2139181 | 11/1984 | United Kingdom . |
| 2214892 | 9/1989 | United Kingdom . |
| 8304122 | 11/1983 | World Int. Prop. O. ............ 40/322 |

Primary Examiner—Kenneth J. Dorner
Assistant Examiner—J. Bonifanti
Attorney, Agent, or Firm—Oblon, Spivak, McClelland, Maier & Neustadt

[57] ABSTRACT

A clip-on marker for electrical or optical leads or cables such as petrol engine spark plug leads having an elastomeric outer sheath comprises first and second half-shells that hinge together along one edge and clip together along the other edge to tightly encircle the lead. One half-shell has on its external surface raised or indented regions that are readily perceptible by touch and whose number identifies the marker. The other half-shell may carry a legible identifier. Markers may be moulded in sets, e.g. of six, via a single mold sprue.

6 Claims, 4 Drawing Sheets

CABLE MARKERS

FIELD OF THE INVENTION

This invention relates to a clip-on marker for electrical or optical leads or cables, or for pipes (e.g. carrying medical gases) for fluids such as petrol engine spark plug leads, having an elastomeric outer sheath.

BACKGROUND TO THE INVENTION

Cable markers are disclosed in Patent Specification Nos. GB-A-750670, 1455535, 1547215 and EP-A-0145852, but the markers cannot be identified in a dark or inaccessible situation because they depend on legible markings for identification. A two-part identification collar for coat hangers is disclosed in GB-A-2139181, and a similar security collar is disclosed in GB-A-2130147. Markers for plug leads that can be distinguished by touch are disclosed in DE-A-1110710, but these markers do not simply clip onto the cable and their construction does not lend itself to the manufacture of a set of markers in a single operation.

SUMMARY OF THE INVENTION

This invention is concerned with the problem of providing a set of markers for identifying individual leads in a dark or inaccessible situation, for example when it is necessary to remove the spark plug leads of a petrol engine of an automobile at night, the set being capable of being manufactured inexpensively in a single molding operation and the individual markers being easy to fit about the leads.

The problem is solved, according to the invention, by providing a plastics molding comprising a set of clip-on markers for electrical or optical leads or cables having an elastomeric outer sheath, said markers being in a consecutively numbered set and frangibly connected by runners so that the molding can be formed in a single operation and individual markers can easily be separated from the molding by a user, each marker comprising first and second half-shells that hinge together along one edge and clip together along the other edge to tightly encircle the lead, one of the half-shells having on its external surface raised or indented regions that are readily perceptible by touch and whose number identifies the marker.

BRIEF DESCRIPTION OF THE DRAWINGS

Various embodiments of the invention will now be described, by way of example only, with reference to the accompanying drawings, in which.

DESCRIPTION OF THE PREFERRED EMBODIMENTS

Figure 1:
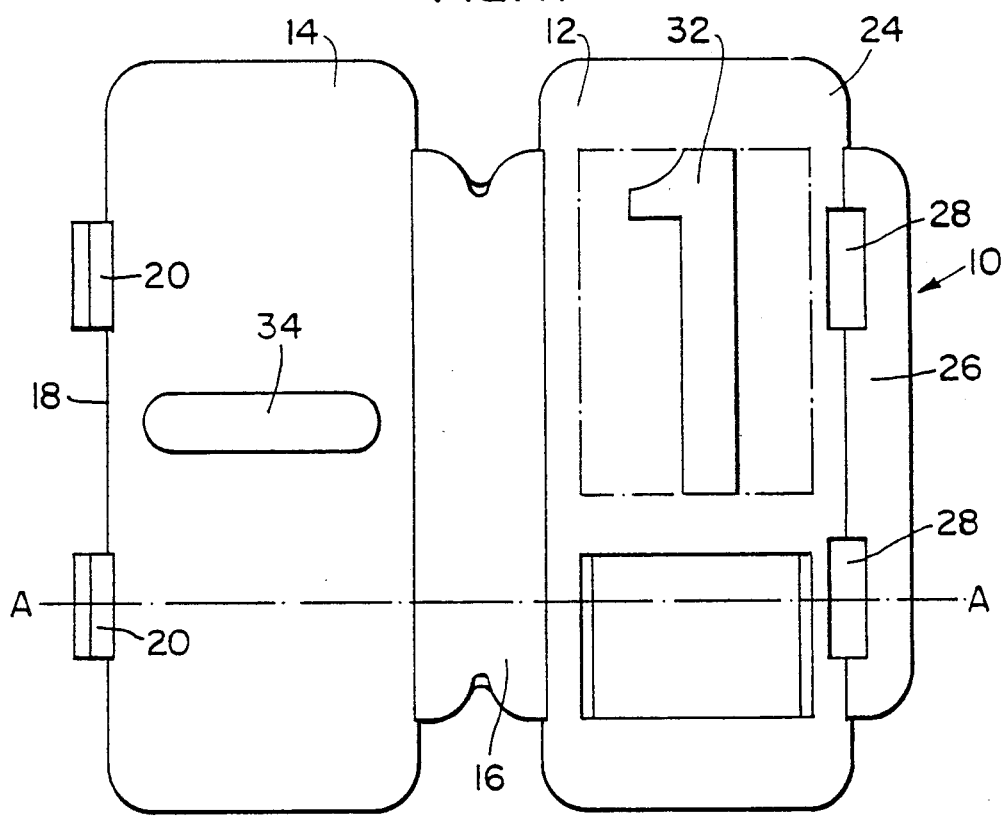
FIG. 1 is a front view of a first form of cable marker according to the invention.
Figure 2:
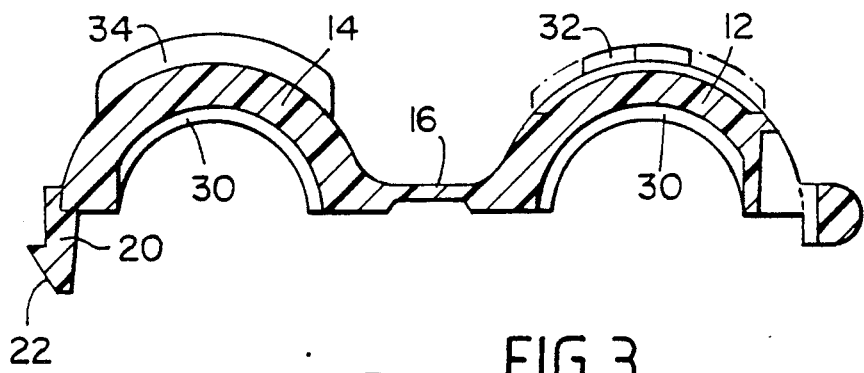
FIGS. 2 and 3 are sections thereof taken on line A—A of FIG. 1 with the halves of the marker flattened out and connected together respectively.
Figure 3:
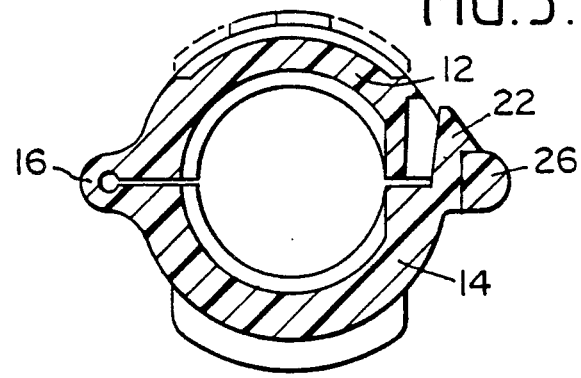

In FIGS. 1–3 there is shown a marker for clipping around an automobile plug lead having a thick sheath of elastomeric material. The marker, generally denoted by the reference numeral 10 comprises a pair of generally semi-cylindrical half-shells 12,14 having a length greater than their diameter and connected along one edge by a region of reduced thickness defining an integrally formed hinge 16. An edge 18 of the half-shell 14 is formed with a pair of tangentially directed axially spaced latch tongues 20 each having an inclined outer cam face 22. The corresponding edge 24 of the other half-shell 12 is formed with a catch bar 26. A pair of slots 28 is formed partly in the catch bar 26 and partly in the body of the half-shell 12 to accept the latch tongues 20 of the first half-shell 14 when the half-shells 12,14 are hinged together. Moderate finger pressure is sufficient to snap-engage the latch tongues 20 behind the bar 26 as shown in FIG. 3 to hold the two halves together. Thus a plug lead may be placed in one half of the marker, the other half of the marker may be hinged around to entrap it, and finger pressure is then applied to push the latch tongues 20 home. The internal diameter of the assembled marker is slightly less than the outside diameter of the intended plug lead which is a gentle push fit therein. For more positive axial location, the inner faces of the half-shells 12,14 are formed with circumferential ribs that bite on, but do not over-compress, the sheath material.

The half-shell 10 is formed on its outer face with a legible identifying numeral 32 defined by an area of raised plastics material. The outer face of the other half-shell 14 is formed with a corresponding number of cross-ribs 34 also defined by regions of raised plastics material. Where the marker represents a number greater than one, the cross-ribs 34 occur at axially spaced positions along the marker, and in this way the identity of the marker can be ascertained by touch, which is an advantage when working on a vehicle engine in darkness or in a confined space. Although raised cross-ribs are considered to be the best, the same tactile response could be obtained by axial ribs or by indentations. The marker is inexpensive to manufacture and easy to apply.

Figure 4:
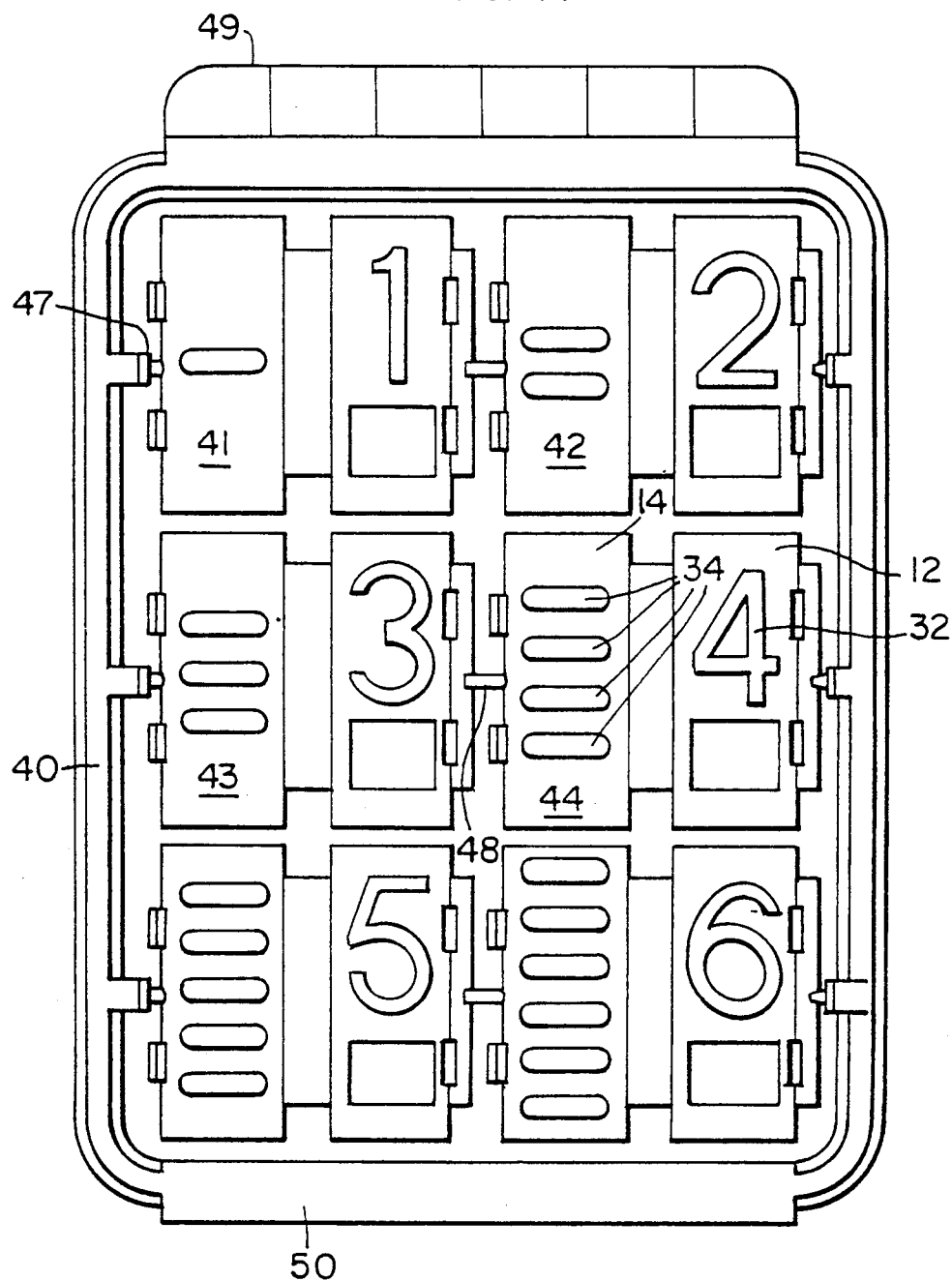
FIG. 4 is a front view of an injection molding sprue in which a set of six cable markers is formed in one step using a single molding tool.

In order to avoid having to stock the markers individually, it is convenient to make or pack them in sets of four, six or eight, one or two such packs being sufficient for any commonly encountered automobile engine. The set of markers may be molded in a single sprue to give a molding detachably supporting all six markers via readily frangible regions. In FIG. 4, such a molding includes a surrounding border 40 supporting markers 41–46 supported by frangible branches 47 and links 48. A region of the surrounding border 40 may be enlarged to form another device such as a plug gap gauge 49 and a second region 50 may be enlarged and flattened for display purposes.

Figure 5:
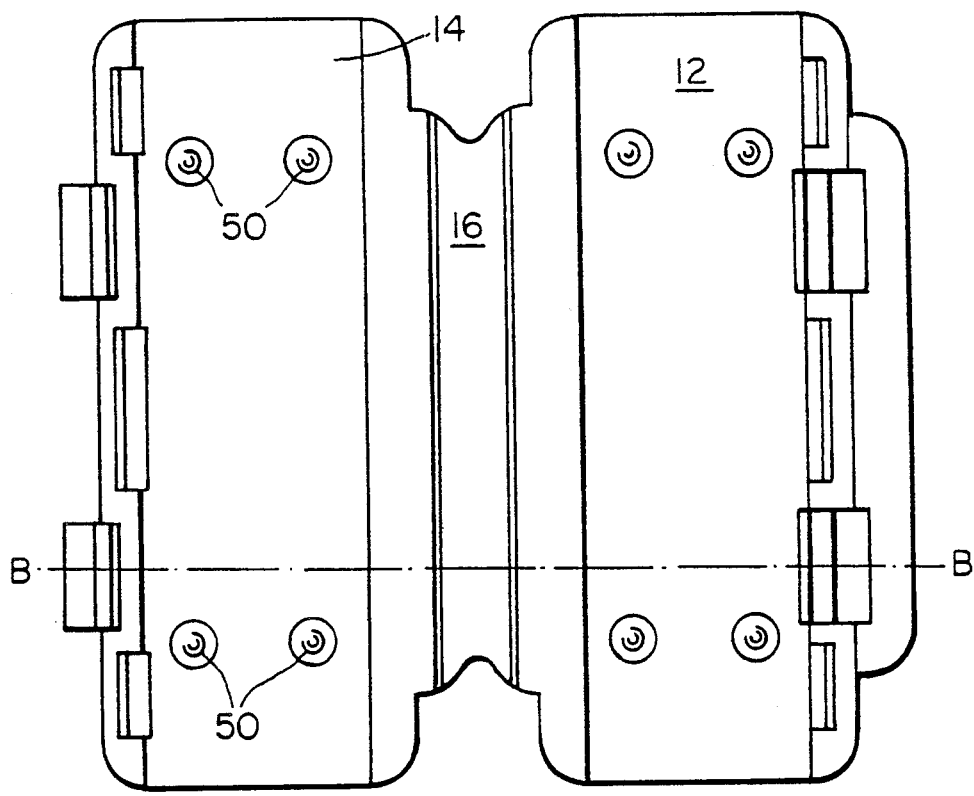
FIG. 5 is a view of a second form of the cable marker from the interior face.
Figure 6:
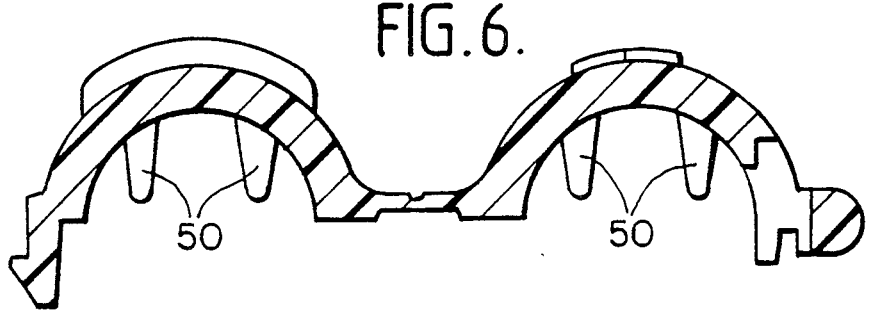
FIG. 6 is a section of the marker taken on the line B—B of FIG. 5, and FIGS. 7 and 8 are sections of the marker closed upon a cable of larger and smaller diameter respectively.
Figure 7:
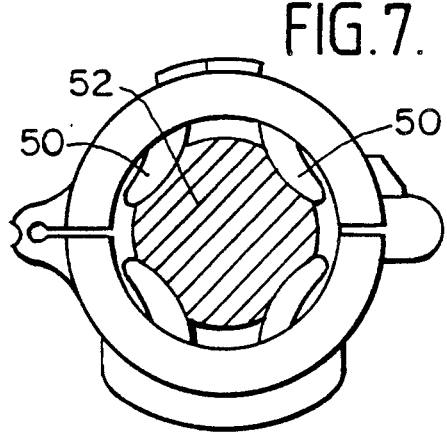
Figure 8:
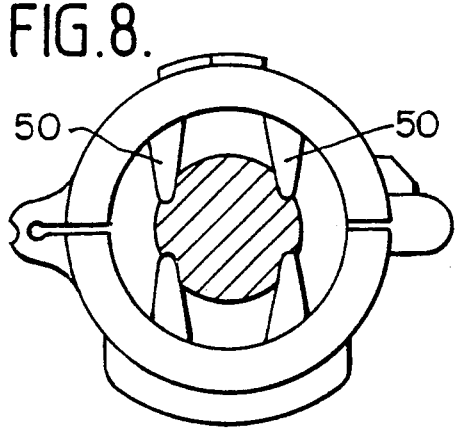
Figure 9:
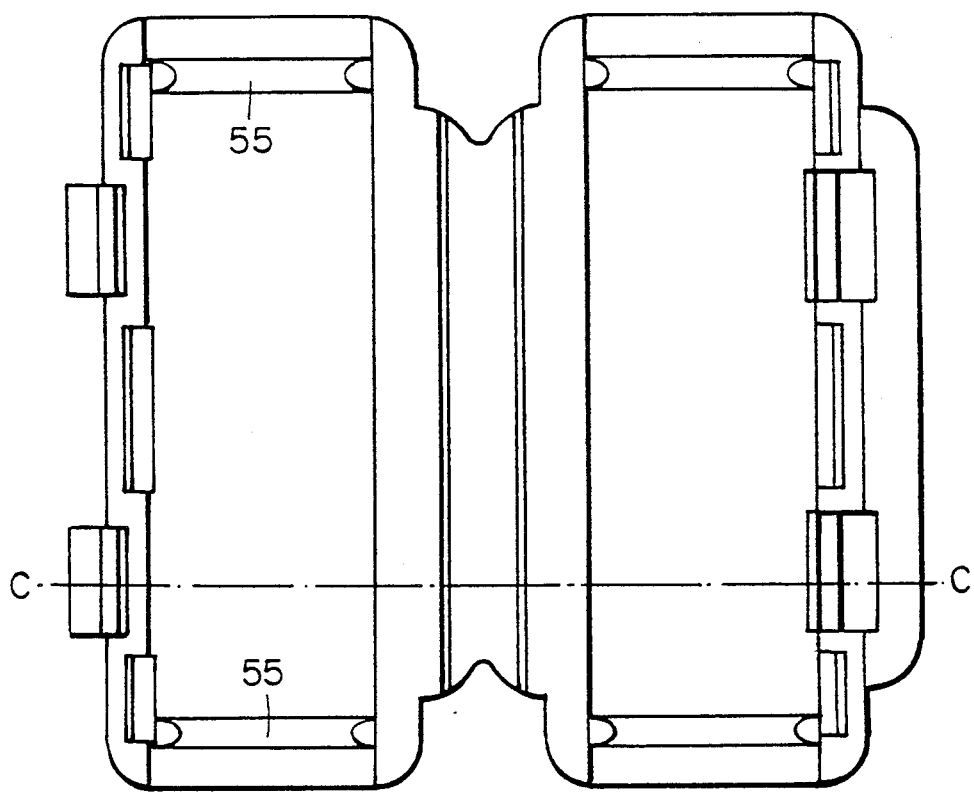
FIG. 9 is a view of a third form of the cable marker from the interior face.
Figure 10:
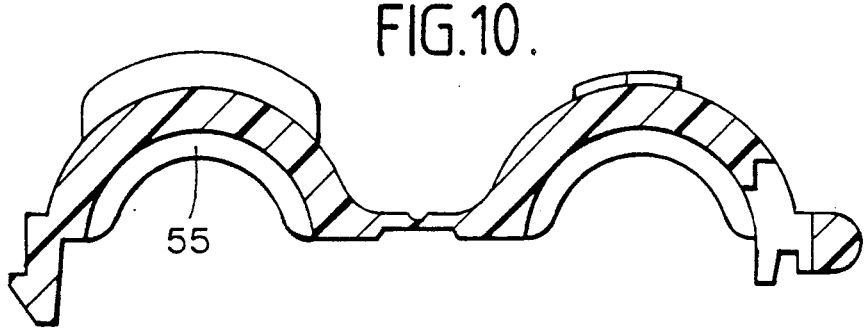
FIG. 10 is a section of the marker taken on the line C—C of FIG. 9, and FIGS. 11 and 12 are sections of the marker closed upon a cable of larger and smaller diameter, respectively.
Figure 11:
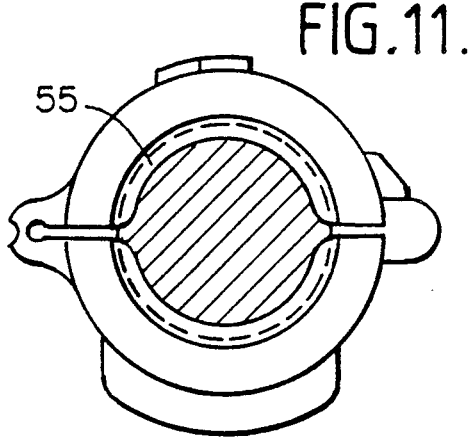
Figure 12:
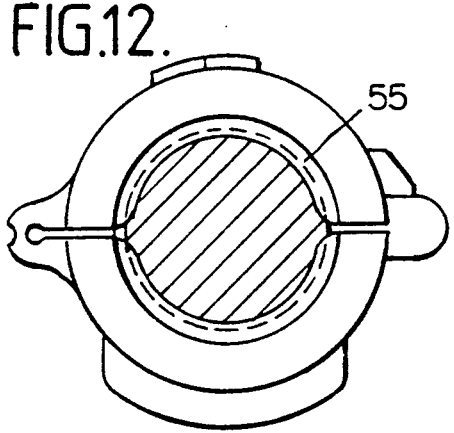

FIGS. 5–8 show a form of the marker for accommodating a range of cable diameters. In FIG. 5 the marker carries two pairs of molded-in cones or protuberances 50 which nip the cable 52 and retain the marker clip axially on the lead. As is apparent from FIGS. 7 and 8, the cones allow various lead diameters to be accommodated from 6.5 mm to 8.0 mm, and their form is such that when the larger diameter leads 52 are fitted, the cones 50 deform or displace to grip the lead. FIGS. 9–12 show a third form in which thin deformable blades 55 of plastics material on the inner faces of the shells 12,14 grip the lead to axially locate the marker on the lead. The blades 55 are designed to be deformable under compression to accommodate alternative diameters of lead.

Obviously, numerous modifications and variations of the present invention are possible in light of the above teachings. It is therefore to be understood that within the scope of the appended claims, the invention may be practiced otherwise than as specifically described herein.

I claim:

1. A plastic molding, which comprises:
   a set of clip on markers for one of electrical leads, optical leads and cables having an elastomeric outer sheath, said markers being disposed in an array in which the individual markers are frangibly connected together by runners so that the molding is formed in a single operation and individual markers are separable from the molding by a user, each marker including first and second half shells of a substantially cylindrical internal profile that are hinged together along one edge and clip together along the other edge to tightly encircle said one of said lead and cable, said first half shells having respectively on external surfaces thereof at least one of either an integral raised region and an integral indented region that are readily perceptible by touch and comprise a number which identifies the marker within the set, an inner face of at least one of said first and second half shells being formed with at least one protuberance for positive axial location of the marker on said one of said lead and cable, said protuberance being deformable for enabling the marker to clip onto any of said one of said lead and cable within a working size range thereof, wherein said second half-shell of each marker carries an identification numeral equal to said number of regions.

2. A molding according to claim 1, wherein said regions comprise at least one integrally formed raised cross rib, which, where more than one said rib is present, occur at regular spacings along the marker.

3. A molding as claimed in claim 1, wherein the set of markers comprises six markers.

4. A molding according to claim 1, wherein the first and second half shells in the array are opened fully apart so as to face in the same direction.

5. A molding according to claim 1, wherein the array comprises a two-dimensional array.

6. A method for identifying plug leads of an internal combustion engine which comprises:
   providing a plastics molding which comprises a set of clip on markers for one of electrical leads, optical leads and cables having an elastomeric outer sheath, said markers including a first and second half shell, said first half shell having on an external surface thereof at least one of either an integral raised region and an integral indented region that are readily perceptible by touch and comprises a number which identifies the marker within the set, wherein said second half-shell of each marker carries an identification numeral equal to said number of regions, an inner face of at least one half shell being formed with at least one protuberance for positive axial location of the marker on said one of said lead and cable, said protuberance being deformable for enabling the marker to clip onto said one of said lead and cable within a working size range thereof;
   displaying said markers in an array in which the individual markers are frangibly connected together by runners so that the molding is formed in a single operation and individual markers are separable from the molding by a user, said first and second half shells being of substantially cylindrical internal profile and being hinged together along one edge for being clipped together along the other edge to tightly encircle said one of said lead and cable;
   separating the molding from the individual clip-on markers; and
   individually fitting the markers to each one of said lead and cable and deforming the protuberance of the marker on said one of said lead and cable.

* * * * *